UNITED STATES PATENT OFFICE.

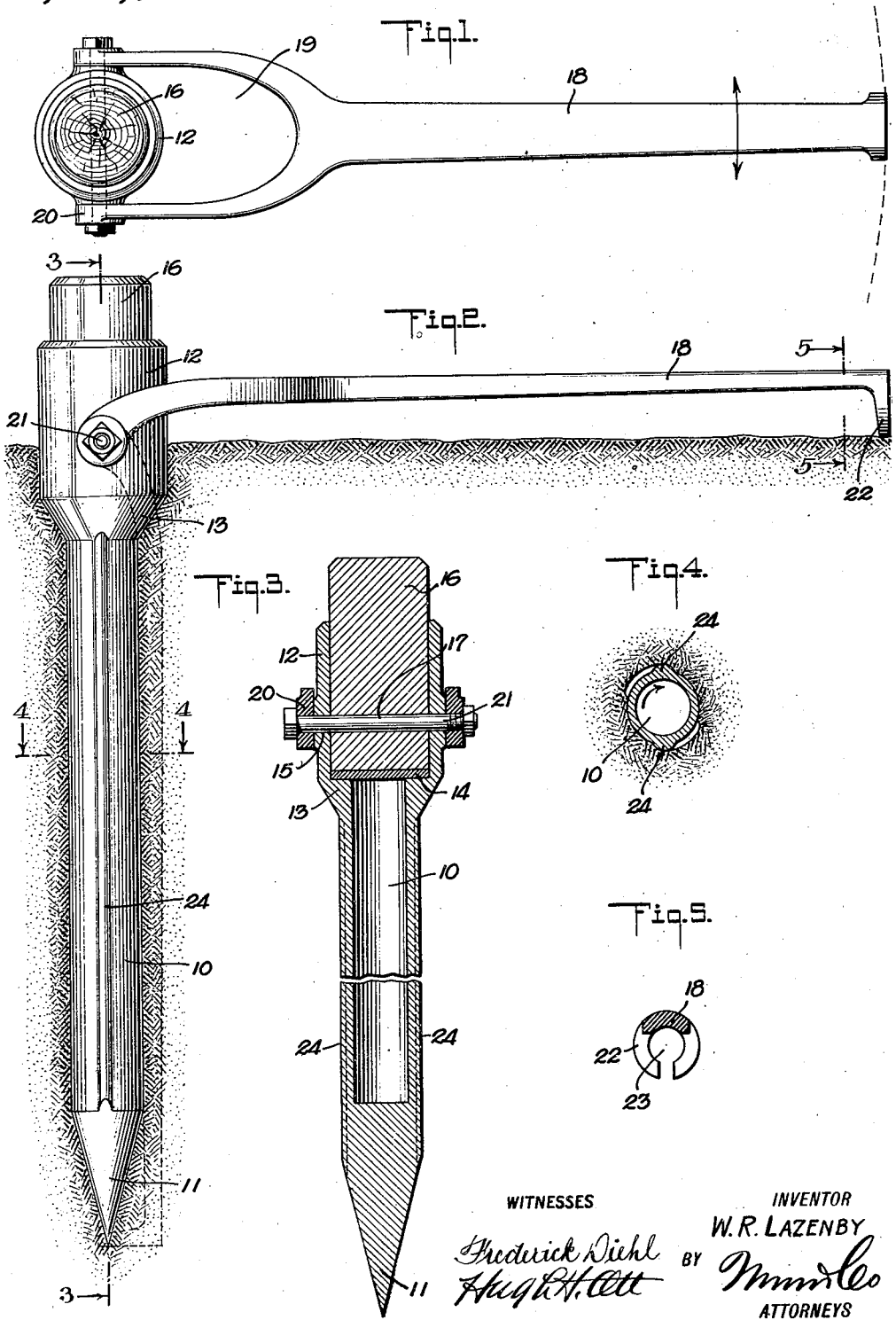

WILLIAM R. LAZENBY, OF HARDIN, MONTANA, ASSIGNOR OF ONE-HALF TO FRANK CLARK, OF HARDIN, MONTANA.

TRAPPER'S TOOL.

1,369,750.  Specification of Letters Patent.  Patented Feb. 22, 1921.

Application filed April 9, 1920. Serial No. 372,511.

*To all whom it may concern:*

Be it known that I, WILLIAM R. LAZENBY, a citizen of the United States, and resident of Hardin, in the county of Big Horn and State of Montana, have invented new and Improved Trappers' Tools, of which the following is a full, clear, and exact description.

This invention relates generally to the class of earth boring tools and has particular reference to a tool constituting a part of a trappers equipment.

One of the principal objects of the present invention is to provide a tool of the character described which is constructed and designed as a means for preparing the ground to permit of the positioning of a trap and trap anchor.

Another object of the invention is to provide a combination tool for forming a well for the reception of a trap anchor and a marking tool for inscribing a mark concentric with said well whereby to provide a working outline for the excavation of a depression to receive the trap proper.

A further object of the invention is to provide a tool including means for revolving the same after it has been driven into the earth, the same also serving as a means for positioning or removing the trap anchor from the well.

A still further object of the invention is to provide a tool which includes means for tamping the earth within the well to securely anchor the trap anchoring means therein.

Another object of the invention is to provide a folding tool, the several parts of which are capable of being nested to occupy a minimum amount of space and which when in folded condition protects the pointed end of the driving shank.

With these and other objects in view which will be more readily apparent hereafter reference is made to the following description, claims and accompanying drawings forming a part of the application, in which—

Figure 1 is a plan view of the tool.

Fig. 2 is a side elevation illustrating the use of the same in forming the anchor well and showing the arm in position for inscribing the mark for outlining the trap receiving depression.

Fig. 3 is a vertical sectional view taken on the line 3—3 of Fig. 2.

Fig. 4 is a horizontal sectional view taken on the line 4—4 of Fig. 2.

Fig. 5 is a detailed sectional view taken on the line 5—5 of Fig. 2.

While the tool is especially constructed and designed for use in connection with the trap and anchor illustrated and described in my co-pending application for Letters Patent of United States, filed February 3rd, 1920, and bearing Serial No. 356,098, it is not necessarily limited to such a use but is intended as a means for preparing a well for any form of anchor and a concentric depression for any type of trap which may be applicable thereto.

Referring to the drawings by characters of reference which denote like parts throughout the several view thereof 10 designates a shank which is preferably of cylindrical construction as illustrated but which may be solid if desired, the purpose of the hollow formation being merely to reduce the weight of the same. This shank is preferably provided with a closed end terminating in a pointed extremity 11. The opposite end is preferably enlarged to provide a cylindrical head 12, the juncture of the same with the shank forming an annular shoulder 13 which receives a disk 14. Diametrically opposed apertures 15 are provided in the head 12 and a removable driving head 16 is adapted to be received by the head 12, the same having a transverse opening 17. An arm 18 is provided and is bifurcated at 19, the extremities of the furcations thereof being provided with alined apertures 20. A pivot bolt 21 is adapted to be passed through the apertures 15 and 20 and the opening 17 whereby to pivotally secure the arm 18 to the head of the shank and retain the driving head 16 within the cylindrical head 12. The free extremity of the arm 18 is provided with a foot 22 which depends therefrom and is preferably provided with a key hole slot 23. Diametrically opposed ribs 24 are provided on and extend from the periphery of the shank 10.

In use of the device the pointed end of the shank is driven into the earth until the pivot bolt 21 is approximately on the level with the surface of the ground. The arm 18 is then used to rotate the shank 10 to permit the ribs 24 to loosen the earth as is clearly illustrated in Fig. 4 of the drawings. At the same time the foot 22 is permitted to engage the ground to describe a concentric circular mark which provides a working outline for the excavation of a depression for the reception of the trap. Several revolutions of the shank will loosen the earth in the well formed thereby sufficiently to permit of the ready withdrawal of the shank therefrom. The arm 18 may then be used to position the trap anchor within the well by engaging the key hole slot of the foot over the rod of the anchor adjacent the anchor plate which is then forced downwardly to the bottom of the well. The foot may then be utilized as a tamper to bury and pack the earth over the anchor plate and about the rod. The foot may also be utilized as a means for removing the anchor, the shank 10 in this instance serving as a handle and if necessary as a lever by removing the removable driving head 16 and inserting a suitable bar, a gun barrel or a limb in the cylindrical head. It is also possible to replace the removable head 16 by a new one after the same has become worn or damaged.

While there has been illustrated and described a single and preferred embodiment of the invention, it is understood that the same is merely illustrative of one method of reducing the same to practice and modifications and variations in the details of construction which fall within the scope of the claims may be resorted to when found expedient.

Having thus described my invention, what I claim as new and desire to secure by Letters Patent; is,

1. In a tool of the character described, a member adapted to enter the ground for forming an anchor receiving well, an arm secured thereto for rotating the same, means at the free extremity of said arm adapted to engage the ground for describing a mark concentric with the well upon rotation of said arm and member.

2. In a tool of the character described, a rotatable ground perforating member, an arm pivoted thereto for rotating the same, means at the free extremity of the arm adapted to engage the surface of the ground for describing a circular mark concentric with the opening formed by the member upon rotation of the same therein, said means serving also as a means for positioning and removing an anchor in the opening.

3. In a tool of the character described, a rotatable ground perforating member, an arm pivoted thereto for rotating the same, means at the free extremity of the arm adapted to engage the surface of the ground for describing a circular mark concentric with the opening formed by the member upon rotation of the same therein, said means serving also as a means for positioning and removing an anchor in the opening, and also constituting a tamping device for packing the earth around the anchor.

4. A tool of the class described including a ground entering and perforating shank member, having formed respectively at its opposite ends a pointed extremity and a cylindrical head provided with transverse apertures, a removable driving head having a transverse opening received by the latter, a bifurcated arm having alined apertures, a pivot bolt adapted to be passed through the apertures in the arm, the cylindrical head and the opening in the removable head for securing the head in place and pivotally associating the arm therewith.

5. A device of the character described comprising a tool shank, a driving head, an arm, means for pivoting the arm to the shank, said means also serving to secure the head thereto, a foot at the free end of the arm constituting means adapted to engage with the ground for describing a circular mark concentric with the ground opening when the shank is arranged and rotated therein, and serving as an anchor positioning and removing means adapted to enter said opening, said arm being also adapted to be folded to a position parallel with the shank whereby the foot will cover and protect the pointed end of said shank.

6. A tool comprising a shank, a pointed extremity adapted to enter the ground, a driving head at its opposite extremity, a radially extending arm pivoted transversely to the head and a portion formed at the free end of the arm adapted to engage the ground surface to describe a circular mark concentric with the well formed by the shank, the portion also serving as a means for positioning and removing a trap anchor in the well and tamping the earth therein.

7. A tool of the character described comprising a headed shank having a pointed extremity at its opposite end and longitudinal ribs, and means secured thereto for rotating the shank after the same is driven into the ground to permit the ribs to loosen the earth about the shank whereby a ready removal of the shank from its self formed opening may be effected.

8. A tool comprising a tubular shank having a closed end provided with a pointed extremity, an enlarged tubular head at the opposite end thereof, the juncture of the bore of said head with the bore of the shank constituting an internal annular shoulder, a disk supported by said shoulder, constituting a bottom wall for the tubular head, said head having diametrically opposed apertures, a bifurcated arm having alined apertures in the furcations thereof, a removable head having a transverse opening therein and a bolt adapted to be received by the opening in the removable head, and the apertures in the tubular head and the furcations for securing the removable head within the tubular head and pivotally supporting the arm therefrom.

WILLIAM R. LAZENBY.